United States Patent [19]

Amano et al.

[11] Patent Number: 5,100,988
[45] Date of Patent: Mar. 31, 1992

[54] INITIATED SCALE-FREE FORMATION OF VINYL CHLORIDE POLYMERS USING WASHING LIQUID AT TEMPERATURE AFFECTING INITIATOR HALF-LIFE

[75] Inventors: Tadashi Amano, Hazaki; Shigehiro Hoshida, Kamisu, both of Japan

[73] Assignee: Shin-Etsu Chemical Co., Ltd., Japan

[21] Appl. No.: 494,325

[22] Filed: Mar. 16, 1990

Related U.S. Application Data

[62] Division of Ser. No. 240,734, Sep. 6, 1988, Pat. No. 4,954,595.

[30] Foreign Application Priority Data

| | | | |
|---|---|---|---|
| Sep. 8, 1987 | [JP] | Japan | 62-224763 |
| Dec. 28, 1987 | [JP] | Japan | 62-335422 |
| Jan. 8, 1988 | [JP] | Japan | 63-2345 |
| Apr. 27, 1988 | [JP] | Japan | 63-104892 |
| May 19, 1988 | [JP] | Japan | 63-123227 |

[51] Int. Cl.$^5$ ............................................. C08F 14/06
[52] U.S. Cl. .............................. 526/344.2; 526/200; 526/202
[58] Field of Search .............. 526/62, 200, 202, 344.2

[56] References Cited

U.S. PATENT DOCUMENTS

| | | | |
|---|---|---|---|
| 3,669,946 | 6/1972 | Koyanagi | 526/344.2 |
| 3,825,512 | 7/1974 | Reiter . | |
| 3,842,055 | 10/1974 | Gabriel . | |
| 4,020,263 | 4/1977 | Winter . | |

*Primary Examiner*—Christopher Henderson
*Attorney, Agent, or Firm*—Parkhurst, Wendel & Rossi

[57] ABSTRACT

A method for preparing vinyl chloride polymers which comprises polymerizing vinyl chloride monomer or a vinylic monomer mixture mainly composed of vinyl chloride in an aqueous medium in the presence of a polymerization initiator, characterized by washing a piping and an opening of a polymerizer, for charging the polymerization initiator into the polymerizer, with water, steam or a washing liquid capable of lowering the half-life of the polymerization initiator to not more than 30 minutes after introducing the initiator into the polymerizer. The method makes it possible to eliminate the formation of polymer scales on the piping and the opening for charging the polymerization initiator into a polymerizer and, therefore, the yield of the vinyl chloride polymers can greatly improved and the production cost can be substantially saved. Moreover, the polymer product does not include any materials used for washing said portions and thus polymer product of high quality can be provided in a high yield.

3 Claims, No Drawings

INITIATED SCALE-FREE FORMATION OF VINYL CHLORIDE POLYMERS USING WASHING LIQUID AT TEMPERATURE AFFECTING INITIATOR HALF-LIFE

This is a division of application Ser. No. 07/240,734 filed Sept. 6, 1988 now U.S. Pat. No. 4,954,595.

BACKGROUND OF THE INVENTION

The present invention relates to a method for preparing vinyl chloride polymers and more specifically to a method for preparing vinyl chloride polymers which makes it possible to provide polymeric products having high quality in a high yield.

It has been known that, when preparing vinyl chloride polymers, for instance, according to suspension polymerization in an aqueous medium, a polymerization initiator which is charged into a polymerizer through a piping and/or an opening for charging the same into the polymerizer is adhered to and/or remains in the piping and/or the opening and reacts with monomers during the polymerization to form polymer scales on these portions. The polymer scales gradually grow during the polymerization to thereby cause clogging of the piping and/or the opening for charging the polymerization initiator into the polymerizer. Therefore, it is often necessary to stop the operation of the polymerizer in order to remove the resultant polymer scales from the piping and/or the opening. Under such circumstances, there have been proposed various methods for preventing the formation of such polymer scales on the inner wall of the piping and/or at the opening for charging the polymerization initiator or removing such polymer scales formed thereon. Examples of such methods comprise the steps of, for instance, washing the piping and/or the opening with a solvent for polymerization initiator or washing these portions of the polymerizer with a solvent and then closing the opening.

However, in the method comprising simply washing the piping and/or the opening with a solvent, if a large amount of solvent is used to remove such polymerization initiator attached to the wall of the piping and/or the opening of the polymerizer, the solvent possibly remains in vinyl chloride polymer as the final product. The solvent remaining in the polymer leads to the reduction in the quality of the final products and giving out a bad smell during fabrication of the vinyl chloride polymer. For this reason, the solvent must be used in a limited amount, but this in turn leads to insufficient removal of the polymerization initiator attached these portions and as a result, more or less the polymerization initiator remains at the opening and/or the piping for charging the same into the polymerizer. Therefore, if the polymerization is continued for a long period of time, the polymer scales grow due to monomers attached to such portions and the opening and the piping for charging it into the polymerizer are finally clogged or closed.

On the other hand, in the latter method in which these portions are washed to some degree and thereafter the opening for charging the polymerization initiator into a polymerizer is closed, a small amount of monomers penetrate into the opening through a closure therefor to likewise form polymer scales and thus the opening and/or the piping are clogged or closed.

Moreover, there has been proposed a method for preparing vinyl chloride polymers in which a polymerization initiator is charged into a polymerizer in the form of an aqueous emulsion in order to eliminate the necessity of using a solvent for washing the piping and/or the opening of the polymerizer.

However, in such a method utilizing polymerization initiator in the form of an aqueous emulsion, the initiator is sometimes attached to or remains in such portions. Therefore, if the polymerization operation is continued for a long period of time, polymer scales are possibly formed on the portions and consequently the opening and/or the piping for charging the polymerization initiator are clogged or closed. Therefore, there is a demand for the development of novel and effective solutions of the problems concerning the formation of polymer scales.

SUMMARY OF THE INVENTION

Accordingly, it is a principal object of the present invention to provide a novel method for preparing vinyl chloride polymers which makes it possible to prevent the formation of polymer scales on a piping and/or an opening of a polymerizer.

It is another object of the present invention to provide a method for preparing vinyl chloride polymers which can provide vinyl chloride polymers of high quality in a high yield.

It is a further object of the present invention to provide a method for preparing vinyl chloride polymers which comprises labour-saving and cost-saving processes.

The foregoing and other objects of the present invention can effectively be accomplished by providing a new method for preparing vinyl chloride polymers which comprises polymerizing vinyl chloride monomer or a vinylic monomer mixture principally composed of vinyl chloride monomer in an aqueous medium in the presence of a polymerization initiator and which is characterized by washing a piping and an opening for charging the polymerization initiator into a polymerizer with water or water steam after charging the polymerization initiator into the polymerizer through the piping and the opening (hereunder referred to as "first method").

According to another aspect of the present invention, there is provided a method for preparing vinyl chloride polymers which comprises polymerizing vinyl chloride monomer or a vinylic monomer mixture principally composed of vinyl chloride monomer in an aqueous medium in the presence of a polymerization initiator and which is characterized in that a piping and/or an opening of a polymerizer, for charging the polymerization initiator into the polymerizer, are washed with a washing solution maintained at a temperature at which the half-life of the polymerization initiator is reduced to not more than 30 minutes after charging the initiator into the polymerizer through said portions (hereinafter referred to as "second method").

DETAILED EXPLANATION OF THE INVENTION

In the present invention, the terms "piping(s)" for charging which is communicated to a polymerizer through an opening and "opening(s)" for charging which is disposed on the polymerizer principally mean the piping(s) for feeding polymerization initiators to the polymerizer and the opening(s) for feeding the polymerization initiators to the polymerizer, which is disposed on the latter, respectively. However, other pipings and openings such as those for introducing monomers or other additives into the polymerizer may also be included.

According to one preferred embodiment of the first method of this invention, an oil-soluble polymerization initiator is used and the monomers are polymerized according to suspension polymerization. In such a case, the piping and the opening for charging the initiator into the polymerizer is washed by passing water or steam through the piping and the opening for charging the initiator to remove the initiator remaining thereon after introducing the same and to prevent the formation of polymer scales and the adhesion of the polymer scales thereto during the polymerization. When water is used as a means for washing the portions, water is passed through these portions for a constant time period during the polymerization, but preferably this washing operation is carried out throughout the polymerization process, i.e., it is initiated immediately after the introduction of the polymerization initiator into the polymerizer and is continued until the polymerization operation is completed by recovering unreacted monomers. Thus, the residual polymerization initiator is removed from such portions and simultaneously the penetration of unreacted monomers into the opening for the initiator is certainly prevented. Alternatively, these portions can be washed with water maintained at a temperature not less than 90° C. or steam. In such cases, the residual polymerization initiator can likewise surely be removed therefrom.

The water used herein may be the same as those commonly used in polymerization systems, such as deionized water and the amount thereof varies depending on the diameter of the opening for charging the initiator and may be determined so that the opening is always filled with water. The temperature of the washing water is preferably selected so as to reduce the half-life of the initiator to not more than one hour. Thus, the polymerization initiator adhered to the wall of the piping and the opening is possibly decomposed and washed away, whereby the formation of polymer and the adhesion of the polymer scales formed thereon can be prevented. In this connection, water is not maintained at such a desired temperature throughout the polymerization and it is sufficient to maintain the desired temperature of water for a constant time period during the polymerization.

On the other hand, if the washing is carried out using water maintained at a temperature of not less than 90° C. or steam, steam existing in the factory as a heat source can be used or water can be heated by means of any known heating method. Therefore, the washing may be carried out without using any specific apparatuses therefor as well as since steam which is preferably heated to a temperature of not less than 120° C. completely decomposes the residual polymerization initiator within a short period of time, the washing time may be reduced to at most one hour, for instance, the same effect can sometimes be achieved within several seconds although it varies depending on the kinds of the polymerization initiators used.

According to the second method of the present invention, the piping and the opening to which polymerization initiators are attached are washed with a washing liquid having an elevated temperature. In this respect, the washing liquid should be maintained at a temperature at which the half-life of the polymerization initiator is reduced to not more than 30 minutes. The term "half-life of the polymerization initiator" herein means a time required for decomposing it to reduce the amount thereof to ½ times the initial concentration of the initiator, which is in general shortened as the temperature thereof increases and varies depending on the kinds of the initiator. This is because, if the washing is carries out using a washing liquid maintained at a temperature at which the half-life of the initiator exceeds 30 minutes, the decomposition of the initiator is too slow to completely remove the initiator remaining at such portions. For this reason, the initiator remains at the piping and the opening, it causes reaction with monomers to form polymer scales thereon and thus these portions are finally clogged.

The washing liquids used in the method of the present invention is not restricted to specific ones and may be ordinary organic solvents. Examples thereof include such as aliphatic hydrocarbon as n-hexane, n-heptane and iso-octane; such an aromatic hydrocarbon as benzene, toluene, xylene and ethylbenzene; such an alcohol as methanol, ethanol and 2-propanol; such a halogenated hydrocarbon as methyl chloride, methylene chloride and chloroform; such an ether as ethyl ether and dichloroethyl ether; such a ketone as acetone, methyl acetone and methyl ethyl ketone; such an ester as methyl formate, methyl acetate, n-butyl acetate and ethyl formate; and derivatives thereof. These organic solvents may be used alone or in combination of two or more of these organic solvents.

In the method of the present invention, the organic solvent to be used in a specific example should properly be selected depending on the polymerization initiator used. In other words, if the temperature at which the half-life of the initiator is not more than 30 minutes corresponds to that higher than the boiling point of an organic solvent selected, the organic solvent causes evaporation in the polymerizer to increase the pressure therein to an unacceptable level and further if such temperature corresponds to that higher than the ignition point of a selected solvent, there is a risk of causing a fire. Therefore, it is necessary to select a stable solvent which has a boiling point, ignition point or decomposition point lower than the temperature at which the half-life of the initiator is not more than 30 minutes.

The amount of the washing liquid is not restricted to a specific amount so far as it is sufficient to wash whole the inner surface of the piping and the opening. However, it is noted that the effect of the present invention can be achieved by using the solvent in an amount extremely lower than that required in the conventional methods. These solvent may be heated to a desired temperature according to any known method.

The method of the present invention may be carried out in accordance with any form of polymerization such as suspension polymerization, emulsion polymerization, solution polymerization and bulk polymerization.

As the starting materials used in the method of this invention, there may be mentioned, for instance, vinyl chloride and a monomer mixture composed of vinyl chloride as the principal component and other vinylic monomers copolymerizable with the former (containing at least 50% by weight of vinyl chloride). Examples of such comonomers which can be copolymerized with vinyl chloride include such a vinyl ester as vinyl acetate and vinyl propionate; acrylic acid, methacrylic acid; maleic acid and esters thereof; such a methacrylate or acrylate as methyl acrylate and ethyl acrylate; such an alpha-olefinic monomer as ethylene, propylene, 1- butene, 1-pentene, 1-hexene, 1-heptene, 1-octene, 1-nonene, 1-decene, 1-undecene, 1-dodecene, 1-tridecene and 1-tetradecene; such a vinyl compound as alkyl vinyl ethers; maleic anhydride, acrylonitrile, styrene, vinylidene chloride and other monomers which may be copolymerized with vinyl chloride.

In this polymerization, a dispersant is in general used, which may be any known dispersants commonly used and examples of such dispersants are such a water-soluble cellulose ether as methyl cellulose, hydroxyethyl cellulose, hydroxypropyl cellulose, hydroxypropylmethyl cellulose; partially saponified polyvinyl alcohol; acrylic acid polymers; such a water-soluble polymer as galatin; such an oil-soluble emulsifying agent as sorbitan monolaurate, sorbitan trioleate, glycerin tristearate and ethylene oxide/propylene oxide block copolymer; and such a water-soluble emulsifying agent as polyoxyethylene sorbitan monolaurate, polyoxyethylene glycerin oleate and sodium laurate. These dispersants may be used alone or in combination of one or more of these agents.

The polymerization initiators which can be used in the invention are not restricted to specific ones and may be those conventionally used to polymerize vinyl chloride monomers. Specific examples thereof include such a percarbonate compound as diisopropyl peroxydicarbonate, di-2-ethylhexyl-peroxydicarbonate and diethoxyethyl peroxydicarbonate; such a peroxy ester compound as tert-butyl-peroxy-neo-decanoate, tert-butyl-peroxypivalate, tert-hexyl-peroxypivalate alpha-cumyl-peroxy-neo-decanoate; such a peroxide as acetyl cyclohexyl sulfonyl peroxide, 2,4,4-trimethylpentyl-2-peroxyphenoxy acetate and 3,5,5-trimethylhexanoyl peroxide; such an azo compound as azo-bis(2,4-dimethyl-valeronitrile) and azo-bis(4-methoxy-2,4-dimethyl-valeronitrile); potassium persulfate; ammonium persulfate and hydrogen peroxide. These may also be used alone or in combination of two or more of them.

In a preferred embodiment of the present invention these polymerization initiators may also be used in the form of an aqueous emulsion. The aqueous emulsion containing such polymerization initiators may be prepared by dispersing polymerization initiators in an aqueous medium using a dispersant. The viscosity of these aqueous emulsions is preferably adjusted so as to be easily charged into a polymerizer before introducing it thereinto to initiate the polymerization. Any dispersants commonly used in suspension polymerization and emulsion polymerization may be employed in the method and examples thereof are partially saponified polyvinyl alcohol, cellulose ethers, ethers of water-soluble starches, polyacrylic acid, and polyoxyethylene sorbitan monolaurate.

Methods for charging an aqueous medium, vinyl chloride monomer and optionally other comonomers and a dispersant to the polymerizer are the same as those known ones and other polymerization conditions such as the ratio of vinyl chloride to other copolymerizable monomers and polymerization temperature may likewise be determined according in the same manner as in conventional methods for preparing vinyl chloride polymers.

In the method for preparing vinyl chloride polymers of the present invention, the polymerization system may contain other additives commonly used in the preparation of such vinyl chloride polymers, for instance, polymerization modifiers, chain transfer agents, pH adjusting agents, anti-gelling agents, antistatic agents and scale inhibitors according to need.

As discussed above in detail, the method of the present invention makes it possible to eliminate the formation of polymer scales at the piping and the opening for charging a polymerization initiator into a polymerizer and, therefore, the yield of polymer can greatly be improved, processes for preparing polymers are simplified and the production cost can be saved because there is no need for removing such polymer scales. Moreover, the polymer product does not contain any solvent or material for washing the piping and the opening for charging the polymerization initiator. Therefore, the method of this invention provides vinyl chloride polymers of high quality in a high yield without using a specific polymerizer.

The method of the present invention will hereunder be explained in more detail with reference to the following non-limitative working Examples. Moreover, the effects of the present invention practically attained will also be discussed in comparison to Comparative Examples given below.

EXAMPLE 1

There were charged, into a stainless steel polymerizer having an internal volume of 2,000 liters, 980 kg of deionized water, 382 g of partially saponified polyvinyl alcohol and 143 g of water-soluble methyl cellulose, followed by deaerrating the polymerizer, charging 700 kg of vinyl chloride monomer thereinto, charging 280 g of di-2-ethylhexyl-peroxydicarbonate by means of a constant delivery pump and then washing the piping and the opening for charging the peroxydicarbonate by passing two liters of deionized water, 500 cc of which was maintained at 80° C. The washing of the piping and the opening with deionized water was continuously fed to the polymerizer through the opening for the initiator, i.e., it was initiated immediately after the polymerization initiator was charged into the polymerizer and was continued till the polymerization was completed by recovering unreacted monomers in a constant rate of 10 ml/min.

The polymerization operation was initiated by raising temperature in the polymerizer to 66° C. while stirring, stopping the polymerization reaction at an instant at which the pressure in the polymerizer was reduced to 6.0 kg/cm$^2$G followed by recovering unreacted monomers and drying and dehydrating the product to obtain vinyl chloride polymer of the present invention.

After such polymerization operation, the piping and the opening for charging the initiator into the polymerizer was dismantled and was observed on whether there were any polymer scales thereon or not. The results were estimated on the following criteria and further the amount of the solvent remaining in the polymer product was determined according to the following method. The results thus observed are summarized in Table I below.

Criteria for Estimating the Conditions of the Scales Attached

A: observed no scale adhered;
B: a small amount of polymer scale was adhered;
C: a large amount of polymer scale was attached and the opening for charging was clogged;
D: covered by polymer scale.

Method for Determining the Amount of the Solvent Remaining in the Polymer

The polymer obtained (5 g each) was charged into a vial, it was then heated to 130° C. for 30 minutes and the gas phase in the vial was analized by gas chromatography. The results given in Table I are expressed in ppm.

EXAMPLE 2

The same procedures as in Example 1 were repeated 100 times to obtain vinyl chloride polymers and then the same observation and measurement as in Example 1 were carried out and the results obtained were also listed in Table I.

EXAMPLE 3

The same procedures as in Example 1 were repeated 1,000 times to obtain vinyl chloride polymers and then the same observation and measurement as in Example 1 were carried out and the results obtained were listed in Table I.

COMPARATIVE EXAMPLE 1

The same procedures as in Example 1 were repeated to obtain vinyl chloride polymers except that the piping and the opening for charging the polymerization initiator into the polymerizer were washed with 300 cc of toluene and then 500 cc of deionized water instead of continuously washing the same with deionized water. After the polymerization, conditions of polymer scales formed on these portions of the polymerizer were observed and contents of the solvent in the resultant polymers were determined according in the same manner as in Example 1. The results thus obtained are listed in Table 1.

COMPARATIVE EXAMPLE 2

The same procedures as in Comparative Example 1 were repeated to form vinyl chloride polymers except that the piping and the opening for charging the initiator was washed with n-hexane in place of toluene and then the same observation and measurement as in Example 1 were carried out after the polymerization. The results thus obtained are listed in Table 1.

COMPARATIVE EXAMPLE 3

The same polymerization procedures as in Comparative Example 1 were repeated to form vinyl chloride polymers except that the washing of the piping and the opening for charging the polymerization initiator with toluene and deionized water was not carried out and then the same observation and measurement as in Example 1 were carried out after the polymerization. The results obtained are listed in Table 1.

TABLE I

|  | Example No. | | | Comparative Example No. | | |
| --- | --- | --- | --- | --- | --- | --- |
|  | 1 | 2 | 3 | 1 | 2 | 3 |
| Condition of scale attached | A | A | B | A | C | D |
| Amount of remaining solvent (ppm) | ≦1 | ≦1 | ≦1 | 400 | 230 | ≦1 |

EXAMPLE 4

The same procedures for preparing vinyl chloride polymers as in Example 1 were repeated except that the piping and the opening for charging the polymerization initiator into the polymerizer was washed with steam pressed thereinto at a pressure of 15 kg/cm$^2$G for 3 minutes instead of washing them with 2,000 liters of deionized water and then the same observation and measurement as in Example 1 were carried out after the polymerization. The results thus obtained are listed in Table II given below.

EXAMPLE 5

The same procedures for preparing vinyl chloride polymers as in Example 4 were repeated 100 times and then the same observation and measurement as in Example 1 were carried out. The results thus obtained are listed in Table II.

EXAMPLE 6

The same procedures for preparing vinyl chloride polymers as in Example 4 were repeated 1,000 times, then the same observation and measurement as in Example 1 were carried out and the results thus obtained were listed in Table II.

TABLE II

|  | Example No. | | |
| --- | --- | --- | --- |
|  | 4 | 5 | 6 |
| Condition of scale attached | A | A | A |
| Amount of remaining solvent (ppm) | ≦1 | ≦1 | ≦1 |

With respect to the estimation criteria A, B and C, reference is made to Example 1.

EXAMPLE 7

There are charged, in a stainless steel polymerizer having an internal volume of 2,000 liters, 980 kg of deionized water, 382 g of partially saponified polyvinyl alcohol and 143 g of water-soluble methyl cellulose, followed by deaerating the polymerizer, charging 700 kg of vinyl chloride monomer thereinto, charging 580 g of 50% aqueous emulsion of di-2-ethylhexyl-peroxydicarbonate by means of a constant delivery pump and then initiating the washing of the piping and the opening for charging the peroxydicarbonate into the polymerizer by passing two liters of deionized water (temperature=80° C.) therethrough. Thus, the deionized water was continuously fed to the polymerizer through the opening for the initiator, i.e., it was initiated immediately after the polymerization initiator was charged into the polymerizer and was continued till the polymerization was completed by recovering unreacted monomers, in a constant rate of 10 ml/min.

The polymerization operation was initiated by raising temperature in the polymerizer to 60° C. while stirring, stopping the polymerization reaction in the instant at which the pressure in the polymerizer was reduced to 6.0 kg/cm$^2$G followed by recovering unreacted monomers and drying and dehydrating the product to obtain vinyl chloride polymer of the present invention and then the same observation and measurement as in Example 1 were carried out. The results thus obtained, which are estimated on the same criteria as in Example 1, are listed in Table III.

EXAMPLES 8 AND 9

The same procedures as in Example 7 were repeated 100 times (Example 8) and 1,000 times (Example 9) to obtain vinyl chloride polymers and then the same observation and measurement as in Example 1 were carried out. The results thus obtained are listed in Table III.

EXAMPLE 10

The same procedures as in Example 7 were repeated to form vinyl chloride polymers except that the piping and the opening were washed with 10 liters of deionized water in one portion after the addition of the polymerization initiator in place of continuously washing these portions with deionized water during the polymerization and then the same observation and measurement as in Example 1 were carried out. The results thus obtained are listed in Table III.

EXAMPLE 11

The same procedures for preparing vinyl chloride polymers as in Example 10 were repeated 30 times and then the same observation and measurement as in Example 1 were carried out. The results thus obtained are listed in Table III.

COMPARATIVE EXAMPLE 4

The same procedures as in Example 10 were repeated to form vinyl chloride polymers except that the piping and the opening for charging the polymerization initiator into the polymerizer were washed with 300 cc of toluene instead of washing the same continuously with deionized water during the polymerization and then the same observation and measurement as in Example 1 were carried out. The results thus obtained are listed in Table III.

COMPARATIVE EXAMPLE 5

The same procedures as in Example 7 were repeated to form vinyl chloride polymers except for omitting the washing of the piping and the opening for charging the polymerization initiator into the polymerizer and the same observation and measurement as in Example 1 were carried out after the polymerization. The results thus obtained are summarized in Table III.

TABLE III

|  | Example No. | | | | | Comp. Ex. No. | |
| --- | --- | --- | --- | --- | --- | --- | --- |
|  | 7 | 8 | 9 | 10 | 11 | 4 | 5 |
| Condition of scale attached | A | A | A | A | B | A | D |
| Amount of remaining solvent (ppm) | ≦1 | ≦1 | ≦1 | ≦1 | ≦1 | 390 | ≦1 |

EXAMPLE 12

The same procedures as in Example 7 were repeated to obtain vinyl chloride polymers except that the piping and the opening for charging the polymerization initiator into the polymerizer was washed with steam pressed into these portions at a pressure of 15 kg/cm$^2$G for 5 minutes instead of washing these portions with deionized water continuously during the polymerization and then the same observation and measurement as in Example 1 were carried out. The results thus obtained are estimated on the same criteria as in Example 1 and are summarized in Table IV given below.

EXAMPLES 13 AND 14

The same procedures as in Example 12 were repeated 100 times (Example 13) and 1,000 times (Example 14) to form vinyl chloride polymers and then the same observation and measurement as in Example 1 were carried out. The results thus obtained are listed in Table IV.

COMPARATIVE EXAMPLES 6 AND 7

The same procedures as in Example 12 were repeated to obtain vinyl chloride polymers except that the piping and the opening of the polymerizer, for charging the polymerization initiator into the polymerizer were washed with 300 cc of toluene (Comparative Example 6) or 300 cc of n-hexane (Comparative Example 7) and then the same observation and measurement as in Example 1 were carried out. The results thus obtained are listed in Table IV.

COMPARATIVE EXAMPLE 8

The same procedures as in Example 12 were repeated to obtain vinyl chloride polymers except for omitting the washing of the portions for charging the polymerization initiator into the polymerizer and then the same observation and measurement as in Example 1 were carried out. The results thus obtained are listed in Table IV.

TABLE IV

|  | Example No. | | | Comparative Example No. | | |
| --- | --- | --- | --- | --- | --- | --- |
|  | 12 | 13 | 14 | 6 | 7 | 8 |
| Condition of scale attached | A | A | A | A | B | D |
| Amount of remaining solvent (ppm) | ≦1 | ≦1 | ≦1 | 390 | 240 | ≦1 |

EXAMPLES 15 TO 18 AND COMPARATIVE EXAMPLES 9 TO 13

In each Example or Comparative Example, 980 kg of deionized water, 382 g of partially saponified polyvinyl alcohol and 143 g of water-soluble methyl cellulose were charged into a stainless steel polymerizer having an inner volume of 2,000 liters, followed by deaerating the polymerizer and then charging 700 kg of vinyl chloride thereinto. Then, 280 g of a polymerization initiator shown in Table V was fed into the polymerizer by means of a constant delivery pump and thereafter the piping and the opening for charging the polymerization initiator were washed with 500 ml of each solvent heated to the temperature shown in Table V (Examples) or 500 ml of a solvent shown in Table V heated to 20° C. (Comparative Examples).

The polymerization operation was initiated by raising the temperature in the polymerizer to 57° C. with stirring, stopping the polymerization reaction in the instant at which the pressure in the polymerizer was reduced to 6.0 kg/cm$^2$G followed by recovering the unreacted monomers and drying and dehydrating the product to obtain vinyl chloride polymers. After finishing the polymerization operation, the same observation and measurement as in Example 1 were carried out and data obtained were estimated on the same criteria as in Example 1. The results thus obtained are summarized in Table V given below.

TABLE V

|  | Example No. | | | |
| --- | --- | --- | --- | --- |
|  | 15 | 16 | 17 | 18 |
| Polymerization initiator | X | X | Y | Z |
| Solvent | toluene | i-octane | o-xylene | n-butyl acetate |

TABLE V-continued

| Amount of solvent (ml) | 500 | 500 | 500 | 500 | |
|---|---|---|---|---|---|
| T (°C.) of solvent | 80 | 80 | 80 | 80 | |
| Condition of scale attached | A | A | A | A | |
| Amount of remaining solvent (ppm) | 300 | 205 | 430 | 410 | |

| | Comparative Example No. | | | | |
|---|---|---|---|---|---|
| | 9 | 10 | 11 | 12 | 13 |
| Polymerization initiator | X | X | Y | Z | X |
| Solvent | toluene | i-octane | o-xylene | n-butyl acetate | — |
| Amount of solvent (ml) | 500 | 2,000 | 500 | 500 | — |
| T (°C.) of solvent | 20 | 20 | 20 | 20 | — |
| Condition of scale attached | B | C | B | C | D |
| Amount of remaining solvent (ppm) | 308 | 2,800 | 3,750 | 417 | ≦1 |

X: di-2-ethylhexyl-peroxydicarbonate (about 65° C.)
Y: tert-butylperoxyneocarbonate (about 75° C.)
Z: azobis-2,4-dimethylvaleronitrile (about 74° C.)
The temperature in the parentheses corresponds to the temperature at which the half-life of the initiator is 20 minutes.
*: measured in benzene.
**: measured in toluene.

EXAMPLES 19 TO 21 AND COMPARATIVE EXAMPLES 14 TO 16

The same procedures as in Examples 15 to 18 were repeated to obtain vinyl chloride polymers except that di-2-ethylhexylperoxydicarbonate was used as the polymerization initiator and that ethylbenzene maintained at the temperature listed in Table VI was used as the washing liquid and the same observation and measurement as in Example 1 were carried out. The results thus obtained are summarized in Table VI given below.

TABLE VI

| | Example No. | | | Comp. Example No. | | |
|---|---|---|---|---|---|---|
| | 19 | 20 | 21 | 14 | 15 | 16 |
| T °C. of ethylbenzene | 110 | 90 | 70 | 50 | 30 | 10 |
| Half life (min.) of initiator at T °C. | 0.1 | 1.9 | 15 | 240 | 4,500 | 84,000 |
| Condition of scale | A | A | A | B | C | C |

What is claimed is:

1. In a method for preparing vinyl chloride polymers by polymerizing vinyl chloride monomer or a vinyl monomer mixture primarily containing vinyl chloride monomer in an aqueous medium in the presence of a polymerization initiator in a polymerizer having a piping, opening, or both by which the polymerization initiator is charged to the polymerizer, the improvement comprising washing the piping, opening, or both with an organic solvent or organic solvent mixture washing liquid maintained at a temperature at which the half-life of the polymerization initiator is reduced to not more than 30 minutes after the initiator is charged into the polymerizer through the piping, opening, or both.

2. The method of claim 1, wherein the organic solvent is selected from the group consisting of n-hexane, n-heptane, iso-octane, benzene, toluene, xylene, ethylbenzene, methanol, ethanol, 2-propanol, methyl chloride, methylene chloride, chloroform, ethyl ether, dichloroethyl ether, acetone, methyl acetone, methyl ethyl ketone, methyl formate, methyl acetate, n-butyl acetate, ethyl formate, and derivatives thereof.

3. The method of claim 1, wherein the organic solvent is a stable organic solvent having a boiling point, ignition point, or decomposition point higher than the temperature at which the half-life of the polymerization initiator does not exceed 30 minutes.

* * * * *

UNITED STATES PATENT AND TRADEMARK OFFICE
CERTIFICATE OF CORRECTION

PATENT NO. : 5,100,988
DATED : March 31, 1992
INVENTOR(S) : Tadashi AMANO et al.

It is certified that error appears in the above-identified patent and that said Letters Patent is hereby corrected as shown below:

On the Title page, item [30], Foreign Application Priority, please change the second line from "62-335422" to --62-335442-- and the fifth line, change "63-123227" to --63-123277--.

Signed and Sealed this

Eighth Day of June, 1993

Attest:

MICHAEL K. KIRK

Attesting Officer

Acting Commissioner of Patents and Trademarks